United States Patent [19]

West et al.

[11] Patent Number: 5,107,063
[45] Date of Patent: Apr. 21, 1992

[54] AQUEOUS SOLUBLE INFRARED ANTIHALATION DYES

[75] Inventors: Alden D. West; Dietrich M. Fabricius, both of Hendersonville, N.C.

[73] Assignee: E. I. Du Pont de Nemours and Company, Wilmington, Del.

[21] Appl. No.: 606,305

[22] Filed: Oct. 31, 1990

[51] Int. Cl.$^5$ .............................................. C07D 403/08
[52] U.S. Cl. ................................... 548/455; 430/522; 548/478
[58] Field of Search .............................. 548/455

[56] References Cited

U.S. PATENT DOCUMENTS

| | | | |
|---|---|---|---|
| 4,871,656 | 10/1989 | Parton et al. | 430/522 |
| 4,876,181 | 10/1989 | Proehl et al. | 430/522 |
| 4,882,265 | 11/1989 | Laganis et al. | 430/522 |

FOREIGN PATENT DOCUMENTS 63-33477  2/1988  Japan .

*Primary Examiner*—David B. Springer

[57] ABSTRACT

Sulfoalkyl substituted indolenine dyes that absorb infrared radiation and photosensitive elements containing said dyes are disclosed. These dyes are useful as antihalation dyes in infrared sensitive photographic elements which show dye low stain. These dyes are represented by the following structure:

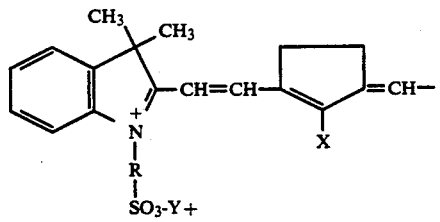

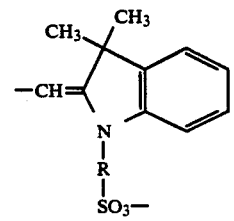

wherein X is F, Cl, or Br; R is a hydrocarbon moiety containing from two to about five carbon atoms; and Y is a cation. In a preferred embodiment X is Cl. In a more preferred embodiment R is $-(CH_2)_3-$ or $-(CH_2)_4-$.

6 Claims, No Drawings

AQUEOUS SOLUBLE INFRARED ANTIHALATION DYES

FIELD OF THE INVENTION

This invention relates to filter dyes that absorb infrared radiation and are useful as antihalation dyes in infrared sensitive photographic elements. Specifically this invention relates to photographic elements which contain sulfoalkyl substituted indolenine infrared antihalation dyes which show low stain.

BACKGROUND OF THE INVENTION

Scattered and reflected incident radiation can expose a radiation sensitive layer in regions in which exposure is not desired. The use of antihalation layers to prevent this unwanted exposure is well known. Typically these auxiliary layers contain a dye, known as antihalation dye, which absorbs the incident radiation. An antihalation layer may be: (1) a backing layer, positioned on the side of the support opposite that bearing the radiation sensitive layer or layers; (2) an undercoat layer, located between the support and the radiation sensitive layer; (3) an interlayer, situated between two radiation sensitive layers; and/or (4) a filter layer, located above the photosensitive layer or layers.

Photographic elements are often used in conjunction with equipment whose output is recorded by exposing the element with infrared radiation emitted by, for example, semiconductor laser diodes. For example, in the medical diagnostics field, digital information from, for example, computer assisted tomography equipment, is often output for viewing onto photographic elements. These elements are generally exposed with diode lasers which emit radiation whose wavelength is from about 730 nm to around 900 nm, generally around 800 nm. Other diode lasers emit around 750 nm, 780 nm, 820 nm, or 870 nm.

Photographic elements used in conjunction with such output devices often require antihalation layers. These layers require antihalation dyes which absorb in the indicated spectral regions. In addition to absorbing the radiation used to expose the photosensitive layer, the antihalation dye should leave little or no undesirable stain after the element is processed. Stain can adversely affect the quality of the image, potentially making the image unusable or, in the case of medical recording film, producing an improper diagnosis.

Indolinium dyes which absorb infrared radiation are known. Sato, Japanese Patent Application Publication 63-33477, discloses infrared sensitive light recording media containing certain sulfoalkyl substituted indolenium dyes. The dyes absorb infrared radiation so that pits are formed in the light recording media. Laganis, U.S. Pat. No. 4,882,265, the disclosure of which is incorporated by reference, discloses photographic elements comprising an antihalation backing containing certain indolenium dyes. The dyes disclosed by Laganis, however, produce low levels of dye stain and may leave undesirable residues in process equipment.

SUMMARY OF THE INVENTION

In one embodiment this invention is a dye useful as an infrared antihalation dye in a photosensitive element, said dye being represented by the following structure:

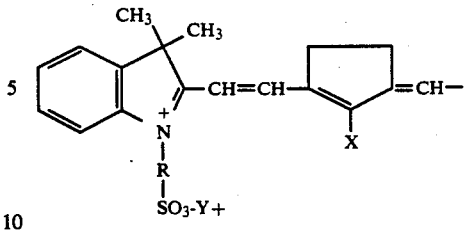

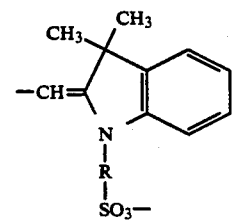

wherein X is F, Cl, or Br; R is a hydrocarbon moiety containing from two to five carbon atoms; and Y is a cation.

In a preferred embodiment X is Cl. In a more preferred embodiment R is —(CH$_2$)$_3$— or —(CH$_2$)$_4$—.

In another embodiment, the invention is a photosensitive element comprising an antihalation layer with low dye stain, said element comprising:

(A) a support, comprising a first side and a second side;

(B) at least one photosensitive layer; and (C) an antihalation layer, said antihalation layer comprising an absorbing amount of an antihalation dye represented by the following structure:

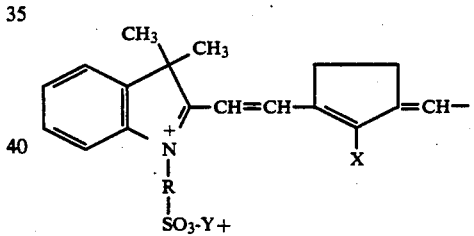

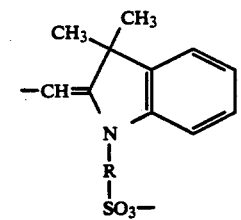

wherein X is F, Cl, or Br; R is a hydrocarbon moiety containing from two to about five carbon atoms; and Y is a cation.

In a preferred embodiment the photosensitive layer and the antihalation layer are present on opposite sides of the support.

In a more preferred embodiment X is Cl. In a still more preferred embodiment R is —(CH$_2$)$_3$— or —(CH$_2$)$_4$—.

DETAILED DESCRIPTION OF THE INVENTION

The invention is a photographic element comprising a support, a photosensitive layer, and an antihalation layer comprising an absorbing amount of a novel antihalation dye described herein. The photosensitive layer is present on the first side of the support. By "present on the first side of the support" it is meant that the layer is either in direct contact with the first side of the support or that there may be one or more intervening layers between the layer and the first side of the support. By "present on the second side of the support" it is meant that the layer is either in direct contact with the second side of the support or that there may be one or more intervening layers between the layer and the second side of the support. Additional photosensitive layers and antihalation layers may be present on either side of the support.

The antihalation layer is either: (1) a backing layer, present on the second side of the support; (2) an undercoat layer, present on the first side of the support between the support and the radiation sensitive layer or layers; (3) an interlayer, present on the first side of the support and situated between two radiation sensitive layers in cases in which more than one radiation sensitive layer is present; and/or (4) a filter layer, present on the first side of the support, with the photosensitive layer or layers located between it and the support.

Other conventional layers, such as, for example, subbing layers, antistat layers, overcoats, etc, may be present. These conventional layers may be present either between the photosensitive layer and/or the antihalation layer and the support, between the photosensitive layer and the antihalation layer in the case in which both layers are present on the same side of the support, or on the side of the photosensitive layer and/or the antihalation layer away from the support.

Antihalation Layer

The antihalation layer comprises an absorbing amount of an antihalation dye represented by the following structure:

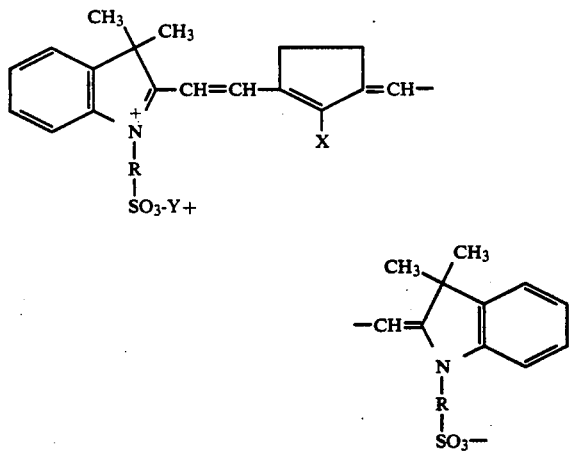

wherein X is F, Cl, or Br; R is a hydrocarbon moiety containing from two to about five carbon atoms; and Y is a cation. "Hydrocarbon moiety" means a group composed of carbon and hydrogen atoms The group may be saturated or unsaturated; straight chain, branched chain, or cyclic. Representative saturated R groups include straight chain groups, such —(CH$_2$)$_2$—, —(CH$_2$)$_3$—, —(CH$_2$)$_4$—, and —(CH$_2$)$_5$—; branched chain groups, such as —(CH$_2$)$_2$—(CH)(CH$_3$)—(CH$_3$)—(CH$_2$)—; and cyclic groups, such as cyclopenthyl. Unsaturated R groups include such groups as, for example, —(CH$_2$)(CH)(CH)(CH$_2$)—.

Dyes of this structure absorb in the near infrared region of the spectrum, e.g., in the spectral region of from 700 nm to 900 nm, and may be used in infrared antihalation layers for photosensitive elements. They are cleanly washed out during development of the element and so leave little or no dye stain. Surprisingly, these dyes produce much less dye stain than the corresponding compounds which contain a cyclohexene ring in place of the cyclopentene ring.

The counter ion, Y, may be any of numerous cations, such as, for example: alkali metal cations, i.e., sodium ion, potassium ion, etc.; alkaline earths, i.e., calcium ion, magnesium ion, etc.; and quaternary ammonium ions, i.e., tetramethyl ammonium, tetraethyl ammonium, etc. Alkali metal cations, especially sodium ion, are preferred.

In the preferred dyes, X is chlorine In the more preferred dyes R is —(CH$_2$)$_3$— or —(CH$_2$)$_4$—. In solution these dyes absorb at 805 nm and so are particularly useful as antihalation dyes in photosensitive elements intended for use with diode lasers which emit in the 790 nm to 820 nm region of the spectrum.

Contemplated equivalents are dyes in which the R group contains substituents, such as, for example, hydroxyl, alkoxyl, carboxyl, carboxylate, sulfonate, etc., which do not adversely affect the properties of the dye, such as, for example, absorption in the infrared and water solubility, required in the practice of this invention, as well as dyes in which the two R groups are different but in which the properties of the dye required in the practice of this invention are not adversely affected.

The antihalation layer also comprises a vehicle. Such vehicles are well-known in the art and include hydrophilic colloids, such as, for example, gelatin, which may be derived from various sources, such as, for example, cattle bone, pigskin, etc.; gelatin derivatives, such as, for example, phthalated gelatin, acetylated gelatin, etc.; polysaccharides, such as, for example, dextran, etc.; synthetic polymers, such as, for example, poly(vinyl alcohol) and water soluble partially hydrolyzed poly(vinyl acetate); acrylamide polymers; polymers of alkyl and sulfoalkyl acrylates and methacrylates; polyamines; poly(vinyl acetals), such as, for example, polyvinyl acetal, etc.; poly(vinyl ethers); etc. Gelatin is preferred.

To prepare the antihalation layer the dye can be dissolved in methanol, ethanol, or another suitable solvent, and added to an aqueous dispersion or melt of the vehicle. "Absorbing amount of an antihalation dye" means an amount of dye at least sufficient to impart antihalation properties to the layer yet not sufficient to cause any deleterious side effects. For antihalation layers an optical density of about 0.25 at the wavelength used for imaging is preferred. Using techniques well known to those skilled in the art, the concentration of dye required to attain this optical density can be calculated from the thickness of the antihalation layer and the absorption spectrum of the antihalation dye, which can be determined by conventional spectrophotometric techniques. The dyes are typically present in the antihalation layer in an amount of 0.005 to 0.05 g/M$^2$, preferably 0.01 to 0.03 g/M$^2$.

PHOTOSENSITIVE LAYER/FILM SUPPORT

The photosensitive layer or layers of the photosensitive element comprises a component which is responsive to infrared radiation. The photosensitive component is, preferably, a conventional gelatino silver halide emulsion or a hydrophilic colloid silver halide emulsion. Conventional photographic silver halide emulsions employing any of the commonly known halides, such as silver chlorine, silver bromide, silver iodide, and mixture thereof, may be used. These may be of varied content and may be negative and/or positive working.

The radiation sensitive layer also comprises a vehicle. Such vehicles are well-known in the art and include the materials useful as vehicles for the antihalation layer, described above. A preferred vehicle is gelatin.

The layer may be hardened by addition of a conventional hardening agent, such as, for example, formaldehyde, glyoxal. Conventional additives may also be present for specific purposes, such as, for example, to enhance and stabilize the response of the emulsion.

The preparation of silver halide emulsions is well known in the art. Silver halide emulsions, their preparation, and the preparation of photosensitive layers therefrom, are described in: *Research Disclosure*, Item 17643, December, 1978; *Research Disclosure*, Item 18431, August, 1979; *Research Disclosure*, Item 22534, January, 1983; and Abbott, U.S. Patent 4,425,426, the disclosures of which are incorporated by reference.

The photosensitive component may be sensitized to infrared radiation by techniques known in the art. Sensitization of silver halide may be accomplished with chemical sensitizers, such as, for example, gold compounds, iridium compounds, or with other group VIII metal compounds, or with spectral sensitizing dyes, such as, for example, cyanine dyes, merocyanine dyes, styryls, etc.

AgIBr grains with about 98.8 mol % bromide and about 1.2 mol%, in which the silver halide grains have a grain size of about 0.01 to 0.04 cubic micrometers dispersed in gelatin may be used to advantage. The sensitizing dye shown in the Example may also be used to advantage to sensitize the emulsion to infrared radiation.

The support can be any of a number of supports for photosensitive elements known in the art. These include polymeric films such as, for example: cellulose ester, such as, for example cellulose triacetate, etc.; polyesters of dibasic aromatic carboxylic acids and divalent alcohols, such as, for example, poly(ethylene terephthalate), poly(ethylene isophthalate), etc.; paper; polymer coated paper; copolymerized vinyl compounds, such as, for example, vinyl acetate/vinyl chloride copolymer; polystyrene; polyacrylates; etc. Dyes may be incorporated into the support to impart a color thereto.

Preferred supports include polyesters made according to Alles, U.S. Pat. No. 2,779,684. These supports are particularly suitable because of their dimensional stability. A particularly preferred support is poly(ethylene terephthalate).

The element may comprise any of a number of the other conventional additives and layers, such as are disclosed in any of the above incorporated references. These include, for example, optical brighteners, antifogants, emulsion stabilizers, image stabilizers, filter dyes, intergrain absorbers, light-scattering materials, gelatin hardeners, coating aids, surfactants, overcoat layers, interlayer and barrier layers, antistat layers, plasticizers and lubricants, matting agents, development inhibitor-releasing compounds, etc. The element can be prepared by coating the layers onto the support using coating techniques which are conventional in the art.

SYNTHESES

Synthesis of Dye 1

2,3,3-Trimethyl-(4-sulfobutyl)indolenium, inner salt 2,3,3-Trimethylindole (16.0 g, 0.01 mol) was heated with 10.4 mL melted 1,4-butanesultone and 20 mL o-xylene at 146° C. for 4 hours. The orange solution was cooled to 60° C. before adding acetone to dilute and induce crystallization. After cooling to room temperature, the product was collected by filtration, washed with acetone, and dried to yield 22.15 g of quaternary salt, mp 236° C.

2-Chloro-3-(dimethylaminomethylene-1-(dimethyliminiummethyl)-cyclopent-1-ene chloride Dimethylformamide (40 mL) and 40 mL dichloromethane were mixed and cooled to 5° C. Phosphorous oxychloride (37 mL) was dissolved in 40 mL dichloromethane and added dropwise to the dimethylformamide/dichloromethane solution at rate to maintain the temperature below 25° C. Cyclopentanone (8.8 g, 0.104 mol) was added and the mixture heated to reflux for 3 hours. After cooling to room temperature, the reaction mixture was poured into 200 mL of ice and allowed to sit overnight. The quenched reaction mixture was filtered twice to remove tarry by-products, then treated with sodium carbonate until the mixture was neutral. The resulting brown precipitate was collected by filtration, water washed, and dried to give 12.20 g blue-violet solid, mp 90°-94° C., $\lambda_{max}$=425 nm ($\epsilon$=38,000).

Dye 1

2,3,3-Trimethyl-(4-sulfobutyl)indolenium, inner salt (5.9 g, 0.02 mol), 2-chloro-3-(dimethylaminomethylene)-1-(dimethyliminiummethyl)-cyclopent-1-ene chloride (2.49 g, 0.01 mol), and sodium acetate (1.64 g, 0.02 mol) were dissolved in 50 mL of acetic acid and 40 mL of acetic anhydride. The mixture was heated at reflux for 1 hour, cooled to room temperature, and poured into 400 mL of stirred ethyl acetate. After settling, the mixture was filtered to yield 7.07 g crude product. Repeated extraction with hot 2-propanol yielded purified product, mp 260° C., $\lambda_{max}$=805 nm ($\epsilon$=218,000).

Synthesis of Dye 2

2,3,3-Trimethyl-(4-sulfopropyl)indolenium, inner salt 2,3,3-Trimethylindole (8.0 g, 0.01 mol) was heated with 4.4 mL melted 1,3-propanesultone and 10 mL o-xylene at 140°-150° C. for 4 hours. The slurry was cooled to 60° C. before adding acetone to dilute and induce further crystallization. After cooling to room temperature, the product was collected by filtration, washed with acetone, and dried to yield 12.9 g of quaternary salt, mp 238° C.

Dye 2

2,3,3-Trimethyl-(4-sulfopropyl)indolenium, inner salt (5.62 g, 0.02 mol), 2-chloro-3-(dimethylaminomethylene)-1-(dimethyliminiummethyl)-cyclopent-1-ene chloride (2.49 g, 0.01 mol), and sodium acetate (1.64 g, 0.02 mol) were dissolved in 50 mL of acetic acid and 40 mL of acetic anhydride. The mixture was heated at reflux for 30 minutes, cooled to room temperature, and poured into 400 mL stirred ethyl acetate. After settling, the mixture was filtered to yield 4.64 g crude product. Repeated extraction with hot 2-propanol yielded purified product, mp 260° C., $\lambda_{max}=805$ nm ($\epsilon=230,000$).

Synthesis of Control Dye A

Control Dye A is described is Laganis, U.S. Pat. No. 4,882,265, the disclosure of which is incorporated by reference. $\lambda_{max}=795$ nm.

Synthesis of Control Dye B

2-Chloro-3-(hydroxymethylene)-1-formyl-cyclohex-1-ene

Dimethylformamide (40 mL) and 40 mL dichloromethane were mixed and cooled to 5° C. Phosphorous oxychloride (37 mL) was dissolved in 40 mL dichloromethane and added dropwise to the dimethylformamide/dichloromethane solution at rate to maintain the temperature below 25° C. Cyclohexanone (10 g, 0.102 mol) was added and the mixture heated at reflux for 3 hours. After cooling to room temperature, the reaction mixture was poured into 200 mL of ice and allowed to sit overnight. The quenched reaction mixture was filtered to collect 3.59 g solid, mp 127° C., $\lambda_{max}=325$ nm ($\epsilon=14,000$).

Dye B 2,3,3-Trimethyl-(4-sulfobutyl)indolenium, inner salt (5.62 g, 0.02 mol), 2-chloro-3-(hydroxymethylene)-formyl-cyclohex-l-ene (2.49 g, 0.01 mol), and sodium acetate (34.28 g, 0.04 mol) were dissolved in 40 mL of acetic acid and 30 mL of acetic anhydride. The mixture was heated at reflux for 10 min, cooled to room temperature, and poured into 400 mL of stirred ethyl ether. After settling, the ether was decanted and remaining oil taken up in methanol and poured into a 10-fold volume of ethyl acetate. The resulting crystals were collected and dried to give 4.08 g, mp 223° C., $\lambda_{max}=780$ ($\epsilon=201,000$).

When appropriately exposed and processed, the photosensitive elements of this invention will yield an image. Exposure may be carried out by any source which emits in the near infrared, such as, for example, a diode laser. The element is particularly useful with sources which emit in the range of 780 nm to 820 nm. Processing the element is carried out by conventional developing techniques such as are described, for example, in any of the references incorporated herein.

The photosensitive elements of this invention are particularly useful for producing hardcopy output, for example, medical data, of images formed from an electronic modality, such as, for example, various types of medical diagnostic equipment, such as, for example, computer assisted tomography equipment. The advantageous properties of this invention can be observed by reference to the following examples which illustrate, but do not limit, the invention. All parts and percentages are by weight unless other indicated.

EXAMPLES

Glossary

Control Dye A: 3H-Indolium, 2-[2-[2-chloro-3-[2-(1,3-dihydro-3,3-dimethyl-2H-indol-2-ylidene)ethylidene]-1-cyclopenten-1-yl]ethenyl]-1,3,3-trimethyl-, trifluoromethanesulfonate Control Dye B: 3H-Indolium, 2-[2-[2-chloro-3-[2-[1,3-dihydro-3,3-dimethyl-l-(4-sulfobutyl)-2H-indol-2-ylidene]ethylidene]-1-cyclohexen-1-yl]ethenyl]-3,3-dimethyl-1-(4-sulfobutyl)-, hydroxide, inner salt, monosodium salt Dye 1: 3H-Indolium, 2-[2-[2-chloro-3-[2-[1,3-dihydro-3,3-dimethyl-l-(4-sulfobutyl)-2H-indol-2-ylidene]ethylidene]-1-cyclohexen-1-yl] ethenyl]-3,3-dimethyl-1-(4-sulfobutyl)-, hydroxide, inner salt, monosodium salt Dye 2: 3H-Indolium, 2-[2l-[2l-chloro-3-[2-[2,3-dihydro-3,3-dimethyl-1-(3-sulfopropyl)-2H-indol-2l-ylidene]ethylidene]-1-cyclopenten-1-yl]ethenyl]-3,3-dimethyl-1-(3-sulfopropyl)-, hydroxide, inner salt, monosodium salt

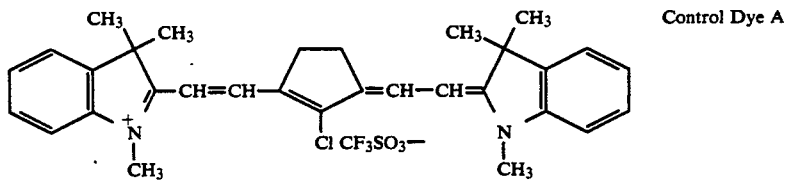

Control Dye A

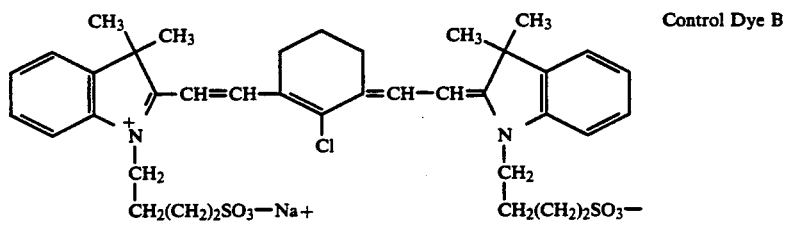

Control Dye B

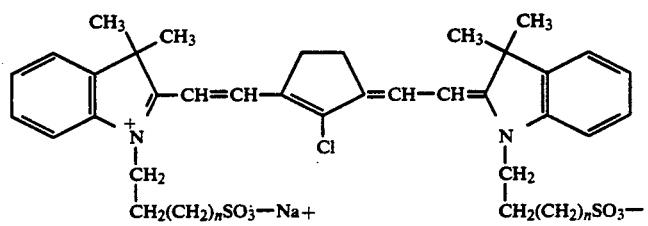

Dye 1: n = 2
Dye 2: n = 1

EXAMPLE 1

Preparation of antihalation layer

A 7% gelatin solution was made by cold soaking and then dissolving dry gelatin (200 g) in water (4,434 g). To this solution was added denatured ethanol (100 g); 5.35% sodium hydroxide solution (1.5 g); 10.5% Triton ® X-100 in water (3.45 g); Saponin (3.1 g); and an amount of 0.03% solution of the dye to be evaluated in methanol adequate to produce the desired concentration The aqueous gelatin solution was then coated onto an about 180 micron thick polyethylene terephthalate support suitably subbed as described in Alles, U.S. Pat. No. 2,779,684. Glyoxal hardener was added to produce 0.031 g glyoxal/g of gelatin. The coated layer was passed through a conventional dryer in which cold air first sets the gelatin and then warm dry air removes the water and alcohol. The resulting element consisted of a polyethylene terephthalate support bearing an antihalation layer containing 4.5 g gelatin/$M^2$.

Evaluation of antihalation layer

The element immersed in standard medical X-ray developer for about 20 sec, fixed, washed and dried Images were visually evaluated for stain on an arbitrary scale of 0 to 12. Results are given in Table 1.

TABLE 1

| Dye | Amount[a] | OD[b] | Stain Color | Stain Level[c] |
| --- | --- | --- | --- | --- |
| None | 0 | 0.05 | none | 0 |
| Control A | 4.15 | 0.32 | green | 5 |
| Control B | 2.65 | 0.23 | green | 8 |
| Control B | 6.1 | 0.30 | green | 12 |
| Dye 1 | 2.65 | 0.33 | green | 3 |
| Dye 1 | 6.1 | 0.48 | green | 7 |
| Dye 2 | 2.65 | 0.23 | green | 0 |
| Dye 2 | 6.1 | 0.33 | green | 5 |

[a] mg of dye/g of gelatin
[b] Optical density at 820 nm before development
[c] 0-2 is excellent; 3-7 good; 8-11 fair; 12 poor

Emulsion and Film Preparation

To prepare a photosensitive element comprising the antihalation layer of this invention, a silver halide emulsion consisting of, for example, AgIBr grains (about 98.8 mol % bromide and about 1.2 mol % iodide) about 0.01 to 0.04 cubic micron, or AgClBr grains (about 70% chloride and about 30% bromide) about 0.01 to 0.045 cubic micron, may be prepared in a small amount of gelatin. After redispersion, this material may be sensitized with gold and mercuric chloride and tetramethylthiuram monosulfide as well-known to those skilled in the art. Conventional antifoggants, stabilizers, and hardeners may be added as well as a spectral sensitizing dye of the following structure:

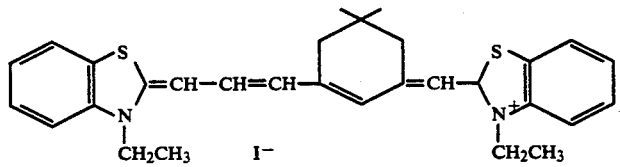

To prepare the photosensitive layer, the silver halide emulsion may be coated onto the element consisting of a support bearing the antihalation layer prepared above. The silver halide may be coated onto the side of the support opposite that containing the antihalation layer. A coating weight of about 2.5-3.2 g of silver/$M^2$ may be used. A hardened gelatin antiabrasion layer containing a matte, e.g., poly(methyl methacrylate), Teflon ® fluorocarbon resin, or polyethylene beads, may be coated over the photosensitive layer.

What is claimed is:

1. A dye, useful as an infrared antihalation dye in a photosensitive element, said dye being represented by the following structure:

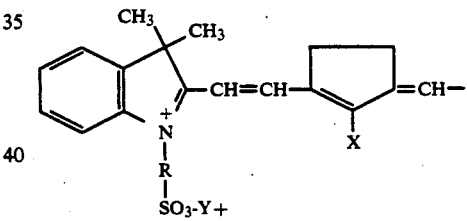

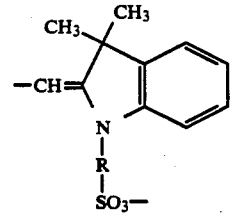

wherein X is F, Cl, or Br; R is a hydrocarbon moiety containing from two to five carbon atoms; and Y is a cation.

2. The dye of claim 1 wherein X is Cl.
3. The dye of claim 2 wherein R is selected from the group consisting of —$(CH_2I)_2$—, —$(CH_2)_3$—, —$(CH_2)_4$—, —$(CH_2I)_5$—, and —$(CH_2I)_2$—(CH) ($CH_3$)—($CH_2$)—.
4. The dye of claim 2 wherein Y is sodium.
5. The dye of claim 2 wherein R is —$(CH_2I)_4$—.
6. The dye of claim 2 wherein R is —$(CH_2I)_4$—.

* * * * *